(12) United States Patent
Hayes et al.

(10) Patent No.: US 6,894,797 B1
(45) Date of Patent: May 17, 2005

(54) METHOD AND APPARATUS FOR SUPPORTING LINE-CONDITIONED DATA STREAM (LCDS) DATA IN A NETWORKED JOB-ORIENTED PRINTING ENVIRONMENT

(75) Inventors: Katherine E. Hayes, Rochester, NY (US); Allan C. Brown, Rochester, NY (US); Mark A. Smith, Rochester, NY (US); Jay Glaspy, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 841 days.

(21) Appl. No.: 09/662,098

(22) Filed: Sep. 14, 2000

(51) Int. Cl.[7] .............................................. G06F 15/00
(52) U.S. Cl. ..................................... 358/1.15; 358/1.13
(58) Field of Search .......................... 358/1.1, 1.5, 1.6, 358/1.13, 1.14, 1.15, 1.16, 1.9, 1.18

(56) References Cited

U.S. PATENT DOCUMENTS 5,050,098 A * 9/1991 Brown et al. .............. 358/1.13
5,651,114 A * 7/1997 Davidson, Jr. .............. 709/229
5,813,020 A * 9/1998 Hohensee et al. .......... 715/515
6,441,919 B1 * 8/2002 Parker et al. .............. 358/1.18

OTHER PUBLICATIONS

"DocuPrint 180 Enterprise Printing System"; *Press and Consultant Teleconference*, 16 pages (Jun. 26, 2000).

* cited by examiner

*Primary Examiner*—Mark Wallerson
(74) *Attorney, Agent, or Firm*—Fay, Sharpe, Fagan, Minnich & McKee, LLP

(57) ABSTRACT

This invention relates to a method and apparatus for supporting line-conditioned data stream (LCDS) data in a job-oriented environment. More particularly, the invention is directed to a job-oriented system that also has the ability to process LCDS data. In addition, the LCDS data is processed in a manner that will exploit advanced job management functions of the system.

20 Claims, 4 Drawing Sheets

METHOD AND APPARATUS FOR SUPPORTING LINE-CONDITIONED DATA STREAM (LCDS) DATA IN A NETWORKED JOB-ORIENTED PRINTING ENVIRONMENT

BACKGROUND OF THE INVENTION

This invention relates to a method and apparatus for supporting line-conditioned data stream (LCDS) data—wherein jobs are identified within the data stream—in a networked, job-oriented printing environment—where jobs are identified by a particular submission protocol, and the data is in the format of a Page Description Language (PDL). More particularly, the invention is directed to a job-oriented system that also has the ability to process LCDS data. In addition, the LCDS data is processed in a manner that will exploit advanced job management functions of the system.

While the invention is particularly directed to the art of supporting LCDS data in a job-oriented environment, and will be thus described with specific reference thereto, it will be appreciated that the invention may have usefulness in other fields and applications. For example, the invention may be used in any printing environment where integration of job-oriented data and other types of data, such as jobless data or sequential line data that is similar to LCDS data, is desired.

By way of background, in the traditional transactional model of printing, multiple customer print jobs are concatenated into a stream of data that is sent to a printer for processing. The stream of data is referred to as a Line Conditioned Data Stream (LCDS). Once the client (usually a main frame computer) makes a connection, the printer is dedicated to sequentially processing that client's data. The printer may identify and provide status on the jobs within the stream, but those jobs cannot be manipulated independently. Operations at the printer affect the entire data stream.

More recently, in networked publishing and office environments, a very different model of printing has been used. This model is job-oriented or event driven. In this job-oriented model, jobs of various PDL formats can be received simultaneously via multiple protocols. These jobs are typically spooled on the controller, allowing the printer operator to rearrange print order, modify job attributes, hold and restart a job, etc. In this environment, concurrent processing and/or management of multiple jobs may occur. Additionally, the jobs are organized into one or more queues, which may have preset 'override' attributes that will be applied to the jobs.

It would be advantageous to be able to accommodate the transactional model of printing (e.g. LCDS data) in a job oriented or event driven environment. Heretofore, no suitable integration of the two models existed in any one system. In this regard, a problem with integrating job-oriented printing with other printing such as that accomplished using LCDS data is that jobs cannot be identified until the data is decomposed and LCDS data does not provide any indication of the end of a job. This results in limited visibility and control by the user. Moreover, the processing of LCDS data by the printer typically requires a dedicated line.

The present invention contemplates a method and apparatus for supporting line-conditioned data stream (LCDS) data in a job-oriented environment that resolves the above-referenced difficulties and others. The invention allows users to have, within a single print system, the benefits of a job-oriented printing environment while simultaneously accommodating the unique requirements of LCDS.

SUMMARY OF THE INVENTION

A method and apparatus for supporting line-conditioned data stream (LCDS) data in a job-oriented environment are provided. The method is particularly applicable to a printing system in communication with an LCDS source (e.g. a mainframe computing system) and a plurality of network components.

In one aspect of the invention, the method comprises the steps of receiving network data from the plurality of network components—the network data representing network print jobs, receiving line-conditioned data stream data from one of the LCDS source and the plurality of network components, the LCDS data representing an LCDS job, scheduling the network print jobs and the LCDS job for processing by the printing system, sequentially processing the network print jobs and the LCDS job based on the job scheduling, designating the LCDS job as a container print job, creating at least one job entity based on the container print job, processing the container print job by processing the at least one job entity, monitoring a status of the processing of the at least one job entity and selectively manipulating the at least one job entity by an operator.

In another aspect of the invention, a system is provided that includes means for accomplishing the method of the present invention.

In another aspect of the invention, the system comprises a first gateway operative to receive network data from the plurality of network components—the network data representing first print jobs, a second gateway operative to receive line-conditioned data stream data from one of the LCDS source and the plurality of network components, print service and control modules operative to maintain and manage the data, attributes, status and control of all print jobs, and to schedule the first and second print jobs for processing by the printing system, a decomposer operative to 1) process the first and second print jobs as directed by the print service and control modules, 2) determine that the second print job is to be processed as a container job and designate it as such to the job pool manager, 3) identify/designate third print jobs, to be maintained by the print service and control modules, based on the second print job, 4) process the second print job by processing the third print jobs, as directed by the print service and control modules, and 5) report status and job information to the print service and control modules and a user interface operative to facilitate manipulation of the third jobs by an operator.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
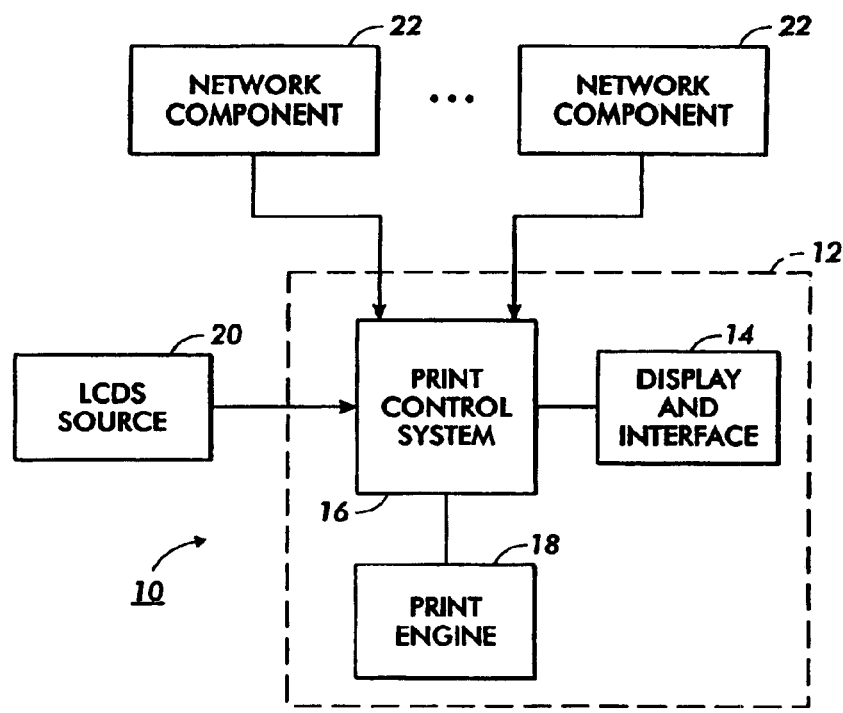
FIG. 1 is a block diagram of an overall system into which the present invention may be incorporated.

Referring now to the drawings wherein the showings are for purposes of illustrating the preferred embodiments of the invention only and not for purposes of limiting same, FIG. 1 provides a view of an overall system into which the present invention is preferably incorporated. As shown, a system 10 includes a printing system 12 (e.g. a printer) having connected thereto or incorporated therein a display and user interface 14, a print control system 16 and a print engine 18. The display and user interface 14 is preferably that of a type to facilitate convenient user interaction with the printer, as will be described in more detail in connection with FIG. 5. The print control system 16 is described in more detail below. The print engine 18 is also of a conventional type known in the art. Typically, such an engine is comprised of electrical, mechanical and process control components for xerographic printing (charge, expose, develop, transfer, clean and fuse), paper transport and, potentially, document finishing (stacking, stapling, etc.), and has the responsibility for physically rendering images on a print medium.

The printer 12 is in communication with a source 20 for line-conditioned data stream (LCDS) data and at least one network component 22. The LCDS source 20 may be a mainframe computer but may also be any other component that submits data to the printer in LCDS format. The network components 22 are preferably work stations; however, these components could be any network component that requires access to the printer. Such network components typically operate in a job-oriented environment and submit data to the printer in various PDL formats via multiple protocols; however, it is to be appreciated that network components may also submit data to the printer in LCDS format.

In this regard, as noted, the traditional LCDS environment is mainframe-connected, but it is also possible in network environments for LCDS jobs to be submitted across a network to a printer. In this case, the data stream is fully captured on the printer's input spool (a disk storage typically on the controller) before scheduling. So, job termination is indicated when the spool file is fully consumed by the decomposer, as with other network print jobs. In this case, as with a data stream on a dedicated line, there may be multiple jobs (documents) which must be identified. However, the multiple jobs are contained in the spool file so identification and manipulation of these jobs is not possible without being decomposed and processed according to the present invention.

LCDS data is received by the printer 12 from the LCDS source or client 20, as is well known and as will be described in more detail below. Most significantly, the source 20 requires a direct connection to the printer, and assumes the printer is a dedicated resource. Also. LCDS data may be received by the printer from network components 22 having such capability, as noted above.

Figure 2:
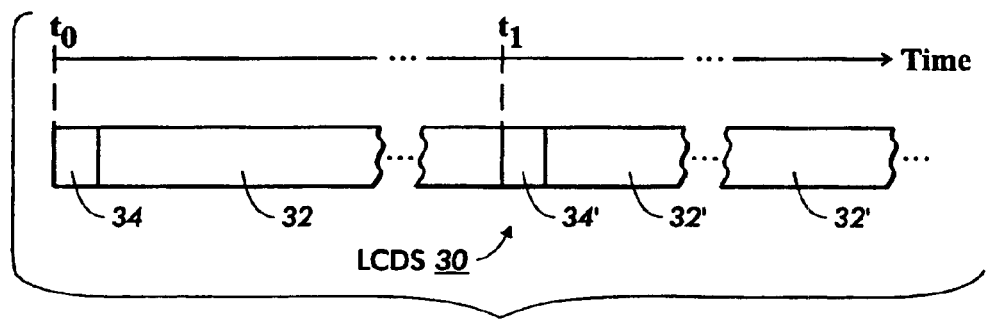
FIG. 2 is a graphic illustration of line-conditioned data stream (LCDS) data.

FIG. 2 is a graphic illustration of line conditioned data stream (LCDS) data 30. As shown, the data stream contains print job data 32, 32', . . . etc. The data 32, 32', . . . etc. comprises information relating to a plurality of different print jobs, each of which is delineated in the stream 30 by a new job marker 34, 34,' . . . etc., respectively. As those skilled in the art will understand, the data stream 30 does not include any information indicative of the end of a job, only the beginning of a new job. For example, as the data streams, the first new job marker 34 is detected at a time $t_0$. This marks the beginning of print job data 32. No "end of job" marker is present in the data stream; however, at time $t_1$, a second new job marker 34' is detected to mark the beginning of print job data 32'. In addition, it will be understood that, although the preferred embodiment is described as accommodating LCDS data, other types of data, such as jobless data, having a structurally and/or functionally similar format could also be accommodated by the system of the present invention.

Likewise, network data is received by the printer from various sources 22 on the associated network as is well known in the art. The network data is typically job-oriented in the form of any of a variety of page description language (PDL) formats including PDF and Postscript. The receipt and processing of network data in a job-oriented environment is well known in the printing field.

Figure 3:
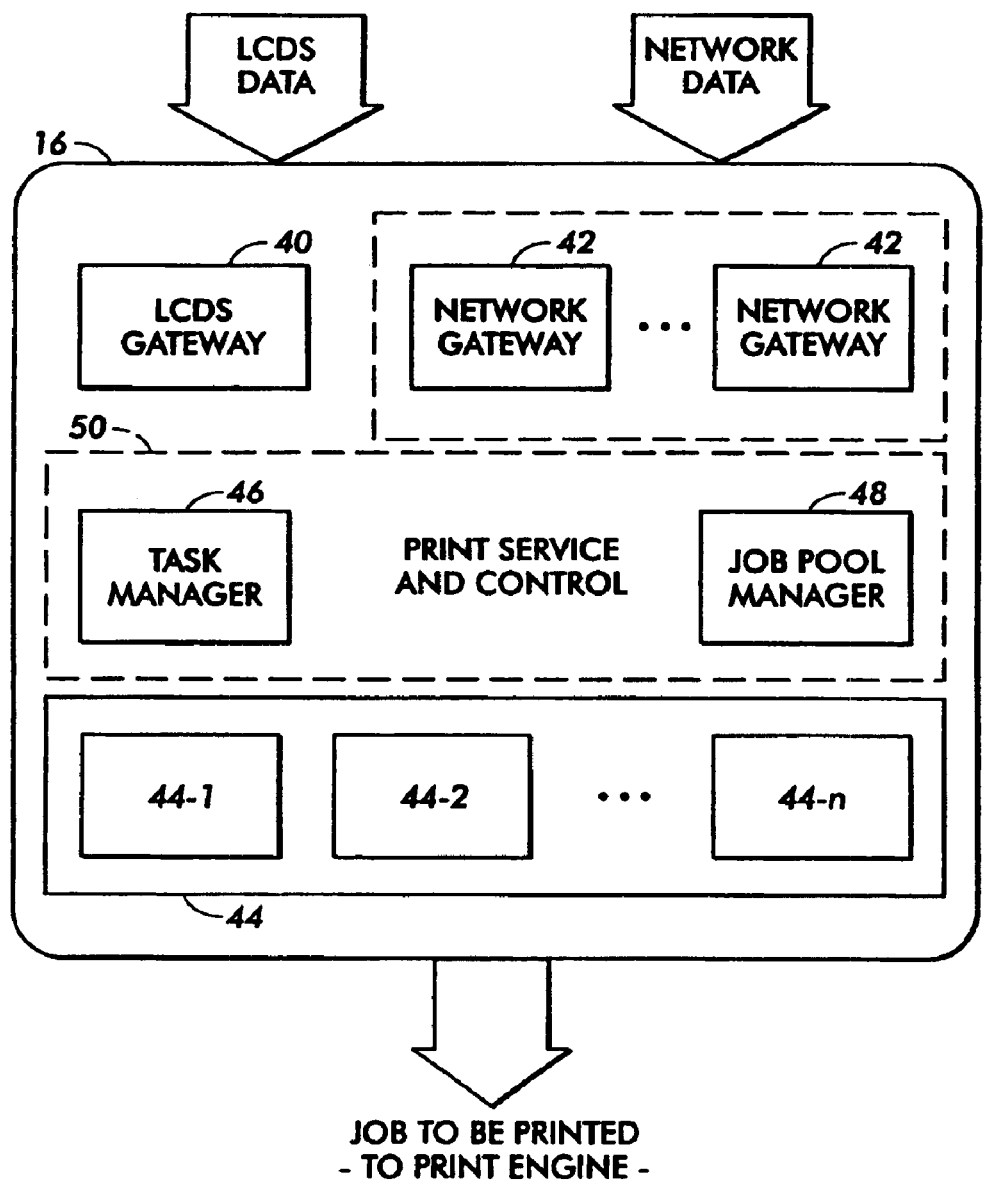
FIG. 3 is a block diagram of a print control system according to the present invention.

With reference now to FIG. 3, the print control system 16 comprises an LCDS gateway 40, at least one network gateway 42, a decomposer portion, or decomposer, 44 having included therein separate decomposers 44-1, 44-2, . . . 44-$n$, a task manager 46, a job pool manager 48, and print service and control module 50 that includes, among other functions (as noted herein, for example), the task manager 46 and the job pool manager 48.

The LCDS gateway 40 provides a conventional channel interface to receive line-conditioned data stream data from a client. Preferably, the LCDS gateway 40 is dedicated to a single client such as a mainframe computer to facilitate suitable handling of the streaming data by the system. The LCDS data is subsequently designated as a container print job by the system.

The network gateway 42 is preferably operative to receive network data from the plurality of network components 20. As noted above, the network data is preferably job-oriented PDL data. However, in selected circumstances, data submitted by a network component may be LCDS data.

The print service and control module 50 schedules the processing of the print jobs, including the network print jobs and an LCDS job, in accordance with a predetermined protocol or algorithm.

The decomposer portion 44 identifies each job as it is encountered in processing. Preferably, the decomposer portion 44 comprises a plurality of decomposers 44-1, 44-2, . . . 44-$n$ to accommodate varying print languages and data formats. Of course, the plurality operates in accord with the scheduling that is determined for the system. The decomposer portion 44 is operative to 1) process network print jobs represented by the network data and LCDS jobs based on a schedule set by the system, 2) determine that an LCDS job is to be processed as a container job and designate it as such to the job pool manager, 3) initiate the creation of job entities based on the container print job, and 4) process the container print job by processing the job entities. It is to be understood that the job entities are simply the print jobs that are delineated in the LCDS data by the new job markers. According to the present invention, these job entities are not only capable of being monitored, but also manipulated in much the same way as job-oriented print jobs. In this regard, in order to allow independent manipulation of, and application of attributes to, each job, the decomposer must initiate the creation of these job entities, for each new job detected in the data stream. The print service and control module 50 will generate the same internal representation and control structures for these job entities as for network print jobs. This allows the print-ready data, generated by the decomposer, for each job entity, to be stored and managed independently, in accordance with the job-oriented environment. Thus, each job entity could, for instance, be independently saved for reprint, or held for screen preview before printing. In addition, the module 50 schedules these job entities initiated by the decomposer. In this regard, the print service/system control module will create the task structures known in the job-oriented environment, but with a modified scheduling algorithm. This algorithm calls for inserting the job in the scheduling order such that it will process immediately, thus preserving the sequential processing of the entire container job as expected by an LCDS source component. Communication between the print service and control module and the decomposer achieves continuity between these job entities derived from a common container. Other jobs (both network and container jobs) may be received and scheduled by the system while a container job representing the LCDS data stream is being processed, but, unless there is deliberate intervention by the user, system control will not allow these unrelated jobs to process between the job entities. Processing of the container job must be terminated, e.g. by taking the system off-line or exhausting the data stored on the spool (in the case where a network component submits the LCDS data), in order for subsequent print jobs of any sort to process. In conjunction with these features, appropriate interfaces allow for continuity between decomposition tasks that share a common data source.

The present invention also provides that, without operator intervention, the jobs within an LCDS data stream will be printed sequentially and use the same printer attribute settings. By default, once the container job, or the LCDS data stream, begins to process, the printer is essentially dedicated to the LCDS client. The print service and control module can concurrently receive and schedule unrelated jobs, but these jobs will not begin to process until processing of the LCDS data stream is terminated. Status of the container job, once it is designated as such, will be maintained by the job pool manager 48, based on the collective status of the processing of the job entities associated with the data stream.

It should be appreciated that each new job entity in the stream will inherit queue attributes, as do jobs submitted from the network; however, the attributes are inherited from the container job. Since each job entity from an LCDS data stream inherits queue attributes at the time it is generated by the decomposer, an operator with sufficient access rights can change the attributes used for processing that job entity. Additionally, the operator can modify attributes of the container job, and the new attributes will be inherited by all subsequently detected job entities in that data stream. This modification or manipulation is accomplished through the user interface 14.

Figure 5:
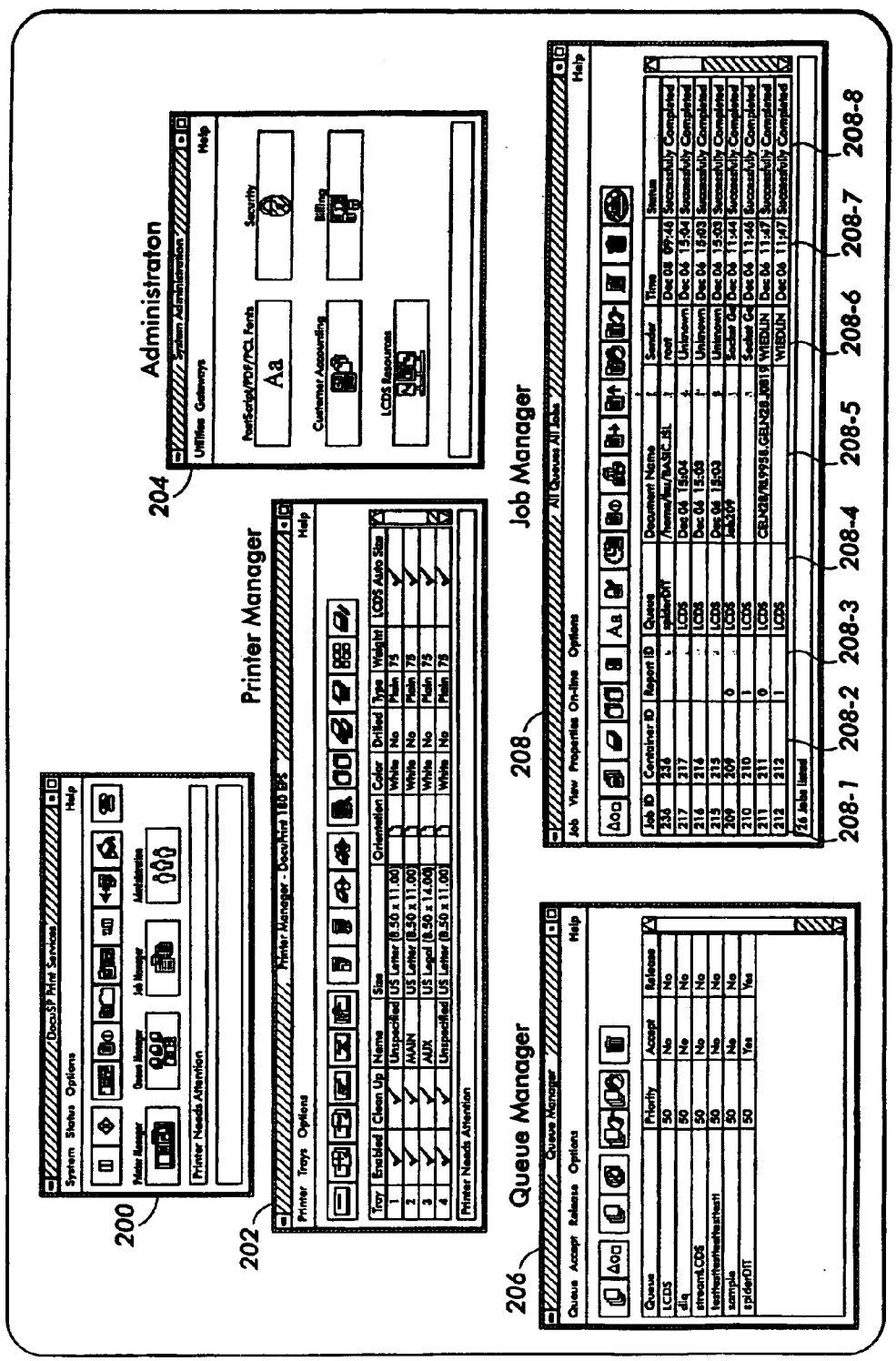

A preferred user interface to be incorporated into the display and interface 14 is a graphical user interface and is shown in FIG. 5. As illustrated, the interface includes a main menu 200, a print manager 202, an administrator 204, a queue manager 206 and a job manager 208.

Advantageously, each job entity from the data stream is thus decoupled from the others for job management purposes. Because the input data for each of these job entities is not independently stored on the system, they can not be held individually for decomposition at a later time. However, these job entities can be individually cancelled. And, with a Print Now feature, a high priority job entity from the data stream, once processed, can be printed ahead of previously processed job entities. Also, in accordance with the job-oriented environment, a user may designate a high priority network job to process and print immediately, interrupting the printing of the LCDS data stream, which will be automatically resumed when the high priority network job completes. Users control these behaviors via an interface such as the Job Manager 208, as shown in FIG. 5, where each network job, container job, and associated job entities generated by the decomposer is listed.

To implement such a listing, preferably, a job identification column 208-1, a container identification column 208-2 and a report identification column 208-3 are provided. As shown in FIG. 5, the column 208-3 identifies the container jobs with a report number of -0- and the associated job entities with a report number that identifies its position within the stream. Importantly, the column 208-1 shows a unique job number for each job or job entity, in accord with the present invention. It is to be recognized that the interface may incorporate other information as desired such as, for example, queue information 208-4, document name information 208-5, sender information 208-6, time information 208-7, and status information 208-8.

The decoupling of these job entities from one another will allow such features as selectively printing jobs within a data stream. The system must still interpret the stream of data sequentially to identify the selected job entities, but processing will be faster as the data is dropped.

Figure 4:
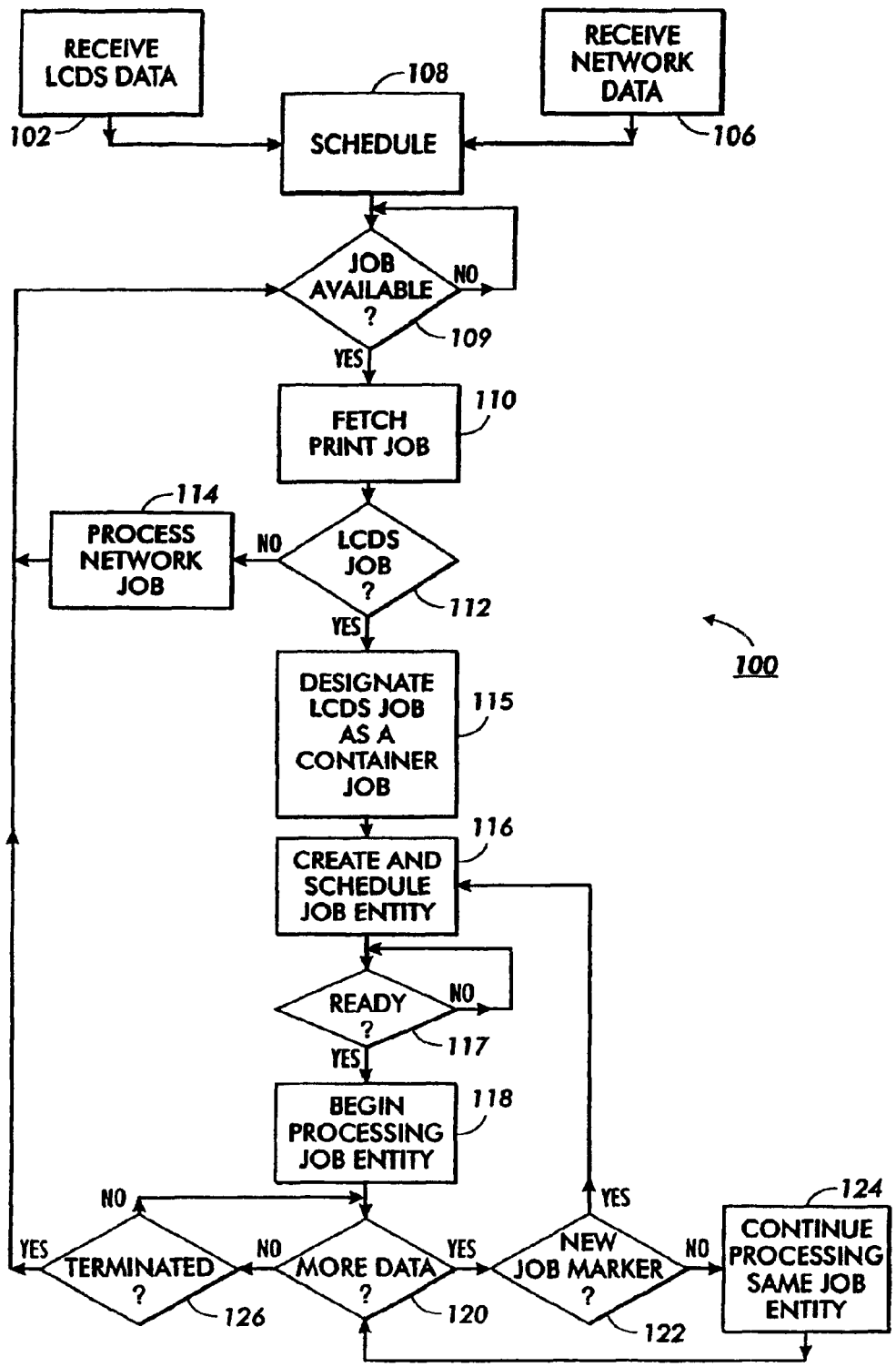
FIG. 4 is a flow chart illustrating a method according to the present invention; and, FIG. 5 is an illustration of a preferred user interface.

Referring now to FIG. 4, a method 100 according to the present invention is illustrated. The method is initiated through receipt of various types of data from various types of sources within the system. In this regard, an LCDS print job is initiated by an operator enabling a connection to the LCDS gateway (step 102). It is to be appreciated that data is preferably received through the LCDS gateway only after the operator intervention. That is, an operator enables a dedicated line to the printer from an LCDS source by, for example, placing the LCDS gateway on-line through the user interface. Likewise, network data is received by the network gateways (step 106). The network data, of course, typically represents network print jobs in a job-oriented format; however, as recited above, data submitted by the network components may also be in LCDS format in selected circumstances. The data submitted by the network in LCDS format, according to the current LCDS standard, will preferably also be designated as a container job at an appropriate time. The print service and control module then schedules the LCDS jobs and the network print jobs (step 108). This scheduling is preferably performed according to a predetermined protocol or algorithm for doing so, as indicated above.

Once scheduling is accomplished, a determination is made as to whether print jobs are ready for decomposition (step 109). A first available print job (whether of the LCDS or network type) is fetched (step 110). A determination is then made whether the fetched print job is an LCDS job (step 112). If not, the fetched network print job is processed in a manner that is known in the art (step 114) and steps 109, 110 and 112 are repeated as appropriate. If the fetched print job is an LCDS job, the job is designated as a container job (step 115) and the decomposer creates a job entity based on the LCDS data included within the container print job (step 116). In this step, the job entity is also scheduled for processing by the appropriate system component. As noted above, control structures are also created for the job entities.

It should be noted that another embodiment of this invention may include a means for a job source component, particularly a network source, to identify, either in the beginning of the data stream or via job attribute defined in submission, that the LCDS job contains only one real job entity and can be processed as a simple network job rather than as a container job.

A determination is made whether the job entity is ready for processing (step 117). For example, to be ready, the job entity must be scheduled, control structures must be in place, etc. When ready, the processing of the new job entity is begun (step 118). The system then detects whether more data is present (step 120). If so, the additional data is processed. As the data is processed, the system determines whether a another new job marker is present (step 122). If not, processing of the additional data as a part of the same job entity currently being processed is continued (step 124) and a determination of whether more data is available is again made at step 120 when appropriate. If a new job marker is detected at step 122, the method returns to step 116. If it is determined at step 120 that more data is not available at that time, then a determination is made as to whether the process is terminated (step 126). If the process has not been terminated, the determination of whether more data is available continues. If the process has been terminated, the current job entity is completed and the decomposer is ready to process the next available job by returning, for example, to step 109.

It is to be appreciated that once the processing of job entities is initiated, the job entities may be monitored and manipulated by an operator through the user interface in much the same way that print jobs based on job-oriented data may be monitored and manipulated by known systems. That is, for example, the operator may change the printing attributes of a particular job entity or modify the attributes of the entire container print job. These attributes include number of copies requested, print media (paper) characteristics such as color, size, etc., one-or two-sided printing, stapling, etc. The clear advantages of the present invention can thus be realized inasmuch as LCDS data is accommodated in a job-oriented environment and the jobs (or job entities) that form the LCDS data can be manipulated to make use of the features of the job-oriented system.

It is also to be appreciated that the system and method of the present invention may be implemented using suitable hardware and software techniques that should be apparent to those skilled in the art with a firm understanding of the invention as described herein.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

What is claimed is:

1. A method for use in a printing system supporting line-conditioned data stream (LCDS) data, the printing system being in communication with an LCDS source and a plurality of network components, the method comprising the steps of:

receiving network data from the plurality of network components, the network data representing network print jobs;

receiving line-conditioned data stream data from one of the LCDS source and the plurality of network components, the line-conditioned data stream data representing LCDS jobs;

scheduling the network print jobs and the LCDS jobs for processing by the printing system;

designating the LCDS job as a container print job;

sequentially processing the network print jobs and the container print job based on the scheduling;

creating at least one job entity based on the container print job;

processing the container print job by processing the at least one job entity;

monitoring a status of the processing of the at least one job entity; and, selectively manipulating the at least one job entity by an operator.

2. The method as set forth in claim 1 wherein the creating of the at least one job entity includes identifying a marker located in the line-conditioned data stream corresponding to each job entity.

3. The method as set forth in claim 1 wherein the creating of the at least one job entity includes creating control structures for printing.

4. The method as set forth in claim 1 wherein, during the processing of the at least one job entity, additional network jobs and container jobs are scheduled.

5. The method as set forth in claim 4 wherein processing of the additional network jobs and container jobs occurs only after termination of the processing of the at least one job entity.

6. The method as set forth in claim 5 wherein terminating the processing of the at least one job entity comprises switching the printing system off-line.

7. The method as set forth in claim 1 wherein the scheduling is based on a predetermined protocol.

8. The method as set forth in claim 1 further comprising registering the at least one job entity on a print service module.

9. The method as set forth in claim 1 wherein the monitoring of the status of the container job includes monitoring a collective status of the processing of the at least one job entity.

10. The method as set forth in claim 1, wherein the container job possesses attributes which are inherited by the at least one job entity, and further wherein the manipulating comprises modifying the attributes.

11. A printing system supporting line-conditioned data stream (LCDS) data, the printing system being in communication with an LCDS source and a plurality of network components, the system comprising:

means for receiving network data from the plurality of network components, the network data representing network print jobs;

means for receiving line-conditioned data stream data from one of the LCDS source and the plurality of network components, the line-conditioned data stream data representing LCDS jobs;

means for scheduling the network print jobs and the LCDS job for processing by the printing system;

means for sequentially processing the network print jobs and the LCDS job based on the scheduling;

means for designating the LCDS job as a container print job;

means for creating at least one job entity based on the container print job;

means for processing the container print job by processing the at least one job entity;

means for monitoring a status of the processing of the at least one job entity; and, means for selectively manipulating the at least one job entity by an operator.

12. The system as set forth in claim 11 wherein a marker is located in the line-conditioned data stream corresponding to each job entity.

13. A printing system supporting line-conditioned data stream (LCDS) data, the printing system being in communication with an LCDS source and a plurality of network components, the system comprising:

a first gateway operative to receive network data from the plurality of network components, the network data representing first print jobs;

a second gateway operative to receive line-conditioned data stream data from the LCDS source;

a print service and control module operative to designate the line-conditioned data stream data as a second print job and schedule the first and second print jobs for processing by the printing system;

a decomposer operative to process the first and second print jobs based on the schedule, determine that the second print job is to be processed as a container print job, create third print jobs based on the second print job, process the second print job by processing the third print jobs, and report status and job information to the print service and control module; and, an interface operative to facilitate manipulation of the third jobs.

14. The system as set forth in claim 13 wherein a marker is located in the line-conditioned data stream corresponding to each third job.

15. The system as set forth in claim 13 wherein the print service and control modules are operative to create control structures for printing the third jobs.

16. The system as set forth in claim 13 wherein, during the processing of the third jobs, the print service and control modules are operative to schedule additional first and second jobs received through the first and second gateways.

17. The system as set forth in claim 16 wherein the decomposer is operative to process the additional first and second jobs only after termination of the processing of the third jobs.

18. The system as set forth in claim 13 wherein the LCDS source is a mainframe system.

19. The system as set forth in claim 13 wherein the second job possesses the attributes which are inherited by the third jobs.

20. The system as set forth in claim 19 wherein the attributes are modified by an operator trough the interface.

* * * * *